United States Patent [19]
Polnauer, deceased et al.

[11] 3,945,574
[45] Mar. 23, 1976

[54] DUAL ORIFICE SPRAY NOZZLE USING TWO SWIRL CHAMBERS

[76] Inventors: Frederick F. Polnauer, deceased, late of New York, N.Y., Wilmia Marie Polnauer, executrix, 250 Riverside Drive, New York, N.Y. 10025

[22] Filed: Feb. 28, 1974

[21] Appl. No.: 446,949

Related U.S. Application Data

[62] Division of Ser. No. 274,467, July 24, 1972, abandoned.

[52] U.S. Cl. .................................. 239/404; 239/406
[51] Int. Cl.² ............................................. B05B 1/34
[58] Field of Search ........... 239/404, 406, 405, 403, 239/464, 468, 462

[56] References Cited
UNITED STATES PATENTS

| | | | |
|---|---|---|---|
| 2,379,161 | 6/1945 | Kraps | 239/404 |
| 2,878,065 | 3/1959 | Watkins | 239/404 |
| 3,116,017 | 12/1963 | Straw et al. | 239/404 |
| 3,362,647 | 1/1968 | Davis, Sr. et al. | 239/404 |
| 3,520,480 | 7/1970 | Halvorsen | 239/404 |
| 3,532,271 | 10/1970 | Polnauer | 239/468 X |
| 3,638,865 | 2/1972 | McEneny et al. | 239/404 X |

*Primary Examiner*—John J. Love
*Attorney, Agent, or Firm*—Darby & Darby

[57] ABSTRACT

Dual orifice spray nozzles for spraying of fluids and other sprayable materials which produce two cone-shaped sprays of very fine droplets that are uniformly discharged by the use of two swirl chambers.

11 Claims, 20 Drawing Figures

DUAL ORIFICE SPRAY NOZZLE USING TWO SWIRL CHAMBERS

This application is a division of my prior copending application Ser. No. 274,467, filed July 24, 1972 entitled "DUAL ORIFICE SPRAY NOZZLE" now abandoned.

The present invention relates to nozzles for spraying materials and more particularly to nozzles of the dual orifice type which eject the material to be sprayed through one orifice in the proximity of a second material which is ejected from a second orifice. In many cases, the second material is a fluid, such as air or gas, which combines with the first material to improve the operational characteristics of the nozzle or to obtain a desired spray characteristic. Nozzles of this type are capable of having a relatively wide range of flow rates in response to a variation of the fluid pressure as compared to nozzles which utilize only a single fluid sprayed through one orifice.

In accordance with the subject invention, various embodiments of dual orifice nozzles are disclosed including those which utilize two swirl chamber bodies, each of which is capable of producing a generally spiral fluid-flow and a spray of very fine droplets. One of the swirl chamber bodies receives the fluid to be sprayed and the other receives a second fluid, which can be the same as the first fluid. Each swirl chamber body forms a generally conical spray which exists through a respective orifice and the two sprays are combined. Various nozzle constructions are provided such that the two bodies and their respective orifices can be concentrically aligned in a simple and positive manner. In the preferred embodiments, the swirl chamber bodies are of the single inlet type to reduce the possibility of clogging.

Another embodiment of the invention utilizes one swirl chamber body having a single inlet for the fluid to be sprayed to produce a first conical spray. An arrangement of ribs is provided so that rotational motion can be imparted to the secondary fluid before it leaves the nozzle through its orifice as a conical spray.

It is therefore an object of the present invention to provide a dual orifice atomizing nozzle.

An additional object is to provide a dual orifice nozzle having at least one swirl chamber body for receiving a first fluid and forming a spray and an arrangement for receiving a second fluid and forming a spray therefrom which reacts with the spray of the first fluid.

It is still an additional object to provide an atomizing nozzle having two swirl chamber bodies, each having single inlets, the first of which receives the fluid to be sprayed and the second of which receives an auxiliary gas or fluid to produce a spray which combines with the spray from the first body.

An additional object is to provide nozzles having two swirl chambers in which the outlet orifices of the bodies are concentrically aligned in a positive manner.

Other objects and advantages of the present invention will become more apparent upon reference to the following specification and annexed drawings, in which:

Figure 1:
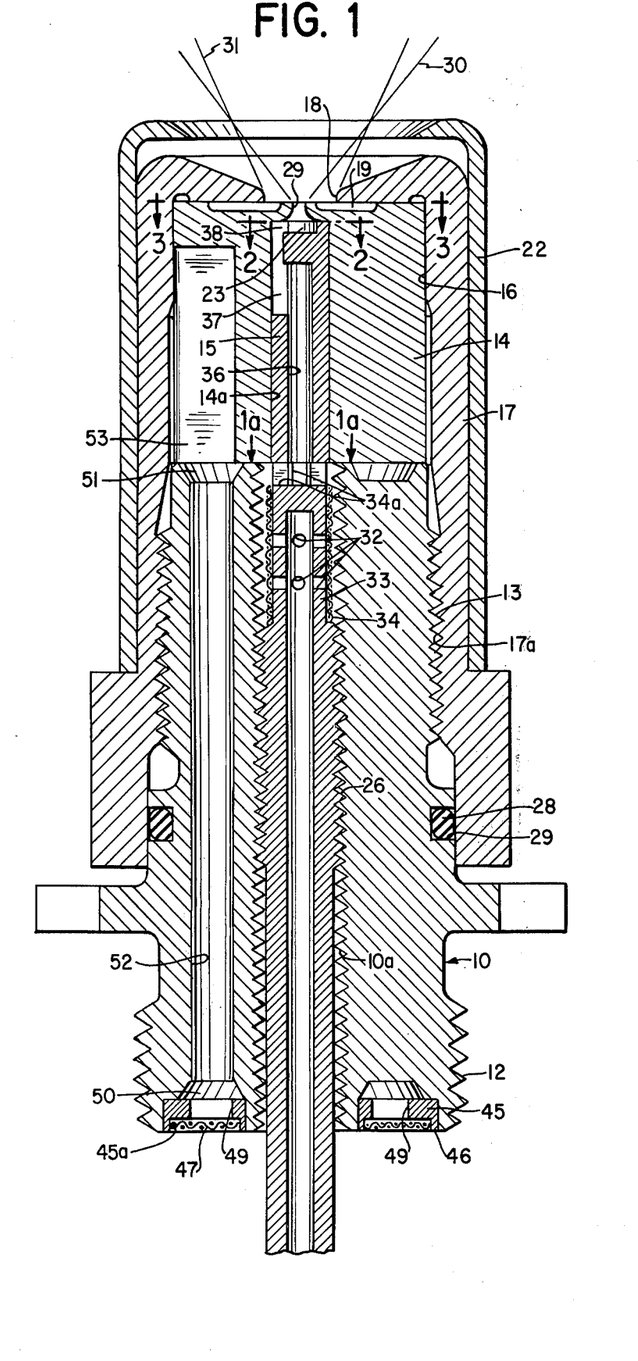
FIG. 1 is an elevational view in cross-section through the center of one embodiment of the dual orifice spray nozzle constructed according to the principles of the invention.

Referring to FIG. 1, a preferred embodiment of a dual orifice spray nozzle includes a nozzle housing 10 of overall cylindrical shape with a set of lower and upper male threads 12 and 13 formed on different portions of its outer diameter. The threaded portion 12 is used to mount the housing of nozzle 10 to the device with which it is to be used, for example, on the combustor wall or the manifold of an engine. Adjacent the top end of housing 10 are mounted an outer secondary swirl chamber body 14 and an inner primary swirl chamber body 15.

The outer swirl chamber body 14 is closely fitted within the inner bore 16 of a threaded cap 17. The upper face of cap 17 also forms the orifice body or plate, with an opening 18 for the swirl chamber 19 of the secondary swirl chamber body 14. The inner wall of cap 17 has a female thread 17a for mating with the male thread 13 of housing 10. By the mating of these threads 13 and 17a the axial alignment of all components of the nozzle is preserved. That is, secondary swirl chamber body 14 is located and gaged within gap 17 and primary swirl chamber body 15 is located and gaged within a central bore 14a of body 14. The central portion of the swirl chamber 19 of the secondary body 14 is formed with an opening 29 which serves as the orifice for the spray from the swirl chamber 23 of primary body 15.

An O-ring seal 28 located in a groove 29 of housing 10 prevents leakage of the fluid between the housing 10 and cap 17. Cap 17 bears firmly down on the upper face of secondary swirl chamber body 14 and thus prevents leakage of the fluid at the upper surface of the body. The inner wall 16 of the cap 17 achieves a gage action with the secondary body 14 and holds the swirl chamber 19 in line with its center at the center of the orifice 18 of cap 17. The outer wall 20 of cap 17 is of circular configuration and an air shroud 22 fits over the cap.

The primary swirl chamber body 15 with its swirl chamber 23 is closely fitted in bore 14a of the secondary swirl chamber body 14 and firmly held in place by a plug 25 which has a male thread 26 along a substantial portion of its outer diameter. Housing 10 has an inner threaded bore 10a and is axially aligned for mating with the thread 26 of plug 25. Plug 25 is provided with a primary fluid (fuel) central passage, or bore, 28 axially aligned with the swirl chamber body 15.

The primary fluid, from a fluid supply conduit (not shown) flows through primary fuel passage bore 28 and through several passage bores 32 located in the cylindrical reduced diameter upper portion 33 of plug 25. These bores are perpendicular to the axis of plug 25. A filter screen 34 is mounted on the outer wall of the upper portion 33 of plug 25. The fuel passes through filter screen 34, continues upward through vertical slots 34a (FIG. 1a) at the upper end of plug 25 and then flows through a central passage bore 36 of primary body 15. From there the fluid flows through cutouts 37 and 38 and a tangential inlet 39 (FIG. 2) of the primary swirl chamber body 15 into the primary swirl chamber 23. The primary fluid circulates in chamber 23 and exits through orifice 29 in the secondary body 14 and orifice 18 of cap 17.

The primary flow circulates in a generalized spiral form, generally a logarithmic spiral, within the primary swirl chamber 23 and is discharged through a primary orifice 29 located at the top end of the secondary swirl chamber body 14 in the shape of a cone which is usually hollow. Orifice 29 is axially aligned with both swirl chamber bodies 14 and 15.

A cylindrical filter housing 45 is mounted at the bottom of housing 10 within an annular recess 46. A filter screen 47 is brazed to an annular recess 45a of filter housing 45. Filter housing 45 has one or more supply inlet bores 49 leading into an annular distributing channel 50 formed in the lower end of housing 10. A supply passage bore 52 in housing 10 leads into an annular distributing channel 51 on top of housing 10. The fluid passing through filter screen 47 and channel 50 continues through the passage bores 52 into distributing channel 51. From there it flows through the cutouts 53 and 54 and the tangential inlet 54a of the secondary swirl chamber body 14 into the secondary swirl chamber 19 (see FIG. 3).

Figures 2, 3, 4, 4A, 4B:
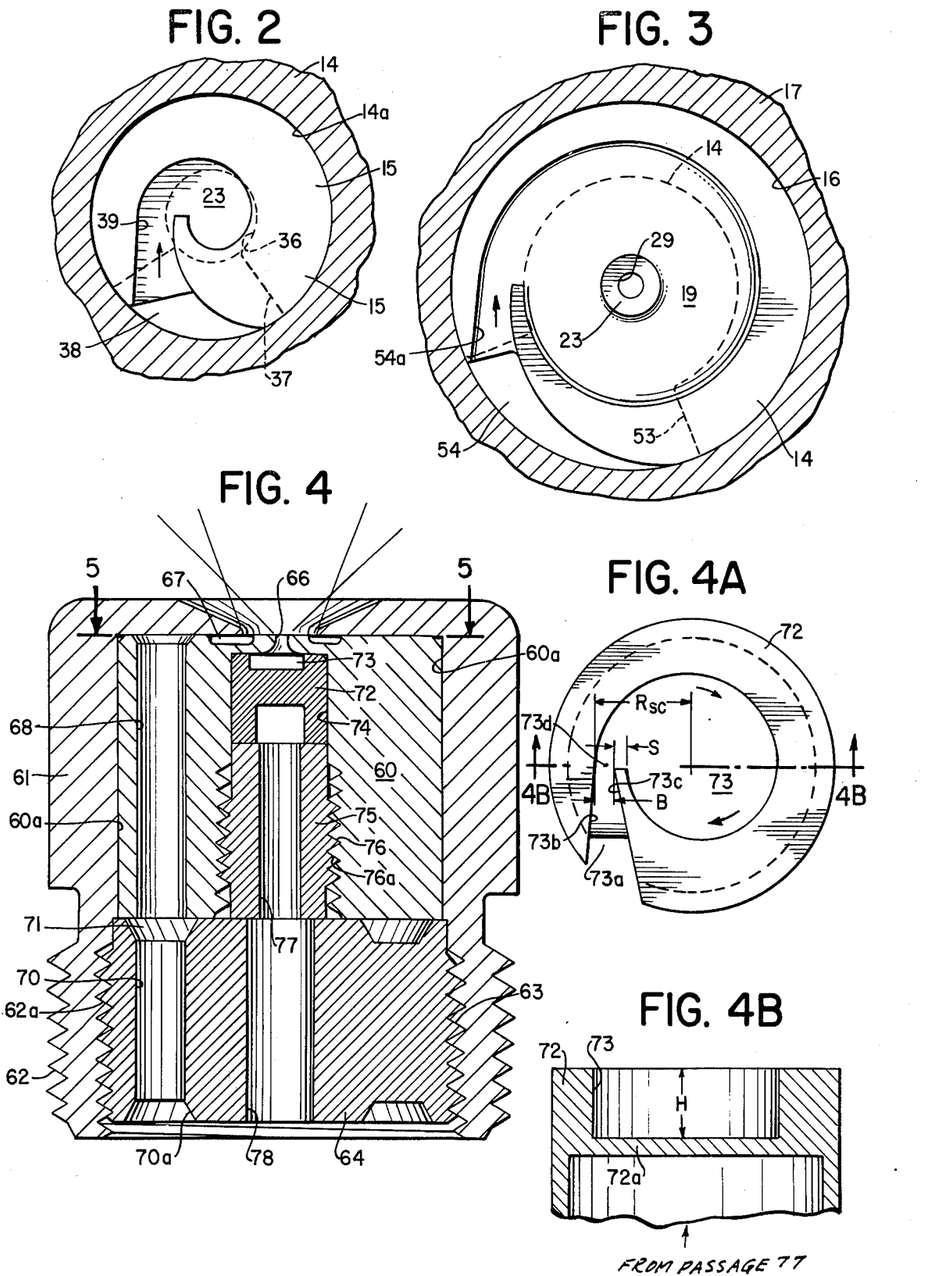
FIG. 2 is a top view of the nozzle taken on line 2—2 of FIG. 1 showing the primary swirl chamber body.
FIG. 3 is a top view of the nozzle taken on line 3—3 of FIG. 1 showing the secondary swirl chamber body.
FIG. 4 is an elevational view in cross-section of another embodiment of a dual orifice spray nozzle.
FIGS. 4A and 4B are top elevational views, the latter in cross-section of the primary swirl chamber for use with the nozzle of FIG. 4.

FIG. 2 shows the primary swirl chamber body 15 in top plan view. The flow path of the fluid in the tangential inlet 39 is indicated by the arrow. The fluid in the swirl chamber 23 takes a generally spiral shape, preferably in the form of a logarithmic spiral, and is discharged through the orifice 29 of secondary body 14. FIG. 3 is a top plan view of the secondary swirl chamber body 14 and the arrow indicates the flow path of the fluid in the tangential inlet 45a. The fluid in the swirl chamber 19 of body 14 also assumes a generally spiral flow, also preferably a logarithmic spiral, and exits through the orifice opening 18 of the cap 17. The primary orifice 29 produces the primary cone 30 of fluid and the secondary orifice 18 produces a secondary cone 31 of fluid.

It is known that flows having the shape of a logarithmic spiral produce very high exit velocities and therefore atomizing energies which are much higher than those produced in conventional multiple inlet swirl chamber nozzles. The combination of two separate logarithmic spiral flows from bodies 14 and 15 which are combined in one dual orifice nozzle produces atomizing effects far superior to those produced by conventional dual orifice nozzles.

It is a feature of the invention that the secondary swirl chamber body 14 has several functions. First of all, it has the secondary swirl chamber 19. In addition, the primary swirl chamber body 15 is located within bore 14a. Further, the primary outlet orifice 29 is formed on body 14. This arrangement offers maximal assurance for the axial alignment of both primary and secondary swirl chambers and of primary and secondary outlet orifices.

FIGS. 4, 4A, 4B and 5 show another embodiment of nozzle which is useful for fuel injection in gas turbine engines. It differs from the embodiment of FIGS. 1–3 in that it has a secondary swirl chamber body 60 of somewhat different construction. Here a nozzle body 61 of generally cylindrical shape is provided with a male thread 62 and a female thread 62a at its lower end portion. Thread 62a mates with the male thread 63 of a secondary plug 64 which engages a secondary swirl chamber body 60 so that its top surface firmly engages the inner surface of housing body 61. This prevents leakage of fluid at the upper surface of the nozzle.

The outside diameter of the secondary swirl chamber body 60 is made to fit closely into and be gaged by a matching bore 60a in the nozzle body 61. Body 60 is formed at its upper end with a swirl chamber 67 and is shaped to provide an outlet orifice 66 for the primary swirl chamber. The secondary swirl chamber body 60 has a longitudinal bore 68, as seen in the top plan view of body 60 in FIG. 5, cut through its entire width. Bore 68 is generally rectangular with rounded ends. At its top end, bore 68 intersects with the tangential inlet 69 of the secondary swirl chamber 67.

The secondary plug 64 is provided with one or more fluid supply passage bores 70 leading into an annular secondary fluid distribution channel 71 at the top of secondary plug 64. The secondary fluid, after passing from a fluid supply conduit (not shown) passes through an annular distributing channel 70a formed in the lower end of plug 64, continues through passage bores 70 into channel 71 and from there into passage 68 of body 60. From there it exists into the swirl chamber 67. The secondary swirl chamber body 60 also contains the primary outlet orifice 66.

A primary swirl chamber body 72 with its primary swirl chamber 73 is closely fitted into a bore 74 of the secondary body 60 and firmly held in place by a primary plug 75 which carries a male thread 76. The inner bore 74 of body 60 is axially aligned with the secondary swirl chamber 67 and orifice 66 of secondary body 60 and has a female thread 76a for mating with the thread 76 of plug 75. Plug 75 is also provided with a primary fuel passage bore 77 which is axially aligned with the secondary swirl chamber body 60. The primary fluid comes from a fluid supply conduit (not shown) and passes through a primary fuel passage bore 78 centrally located in secondary plug 64. The fluid continues through the primary passage bore 77 of plug 75.

The primary swirl chamber body 72 is of the type, for example, as described in my prior U.S. Pat. No. 3,532,271 and is shown in FIGS. 4A and 4B. The fluid from passage 77 enters the lower portion of the body 72 and from there exists into the swirl chamber 73 through a cutout 73a of a transverse wall 72a. The fluid entering the swirl chamber is guidhd between the outer wall 73b of the inlet passage 73d and the inner wall 73c of the inlet passage 73d. Several of the parameters of the swirl chamber are shown in FIGS. 4A and 4B which are:

B = the width of the tangential portion of the inlet close to said opening thereof into the swirl chamber;

H = the height of the chamber;

$R_{sc}$ = the largest radius of the chamber which, itself, is formed in the general shape of a spiral;

S = the thickness of the rib 73c formed by the inner wall of the swirl chamber at the swirl chamber inlet.

The selection of these parameters, and their ratios, is discussed in the aforesaid patent.

The operation of the nozzle of FIGS. 4, 4A, 4B and 5 is similar to that of the nozzle of FIGS. 1–3. That is two sprays are set up in the swirl chambers 67 and 73 of the bodies 60 and 72. The energies of the two sprays produce an excellent atomizing effect.

Figures 5, 6, 7, 8, 9:
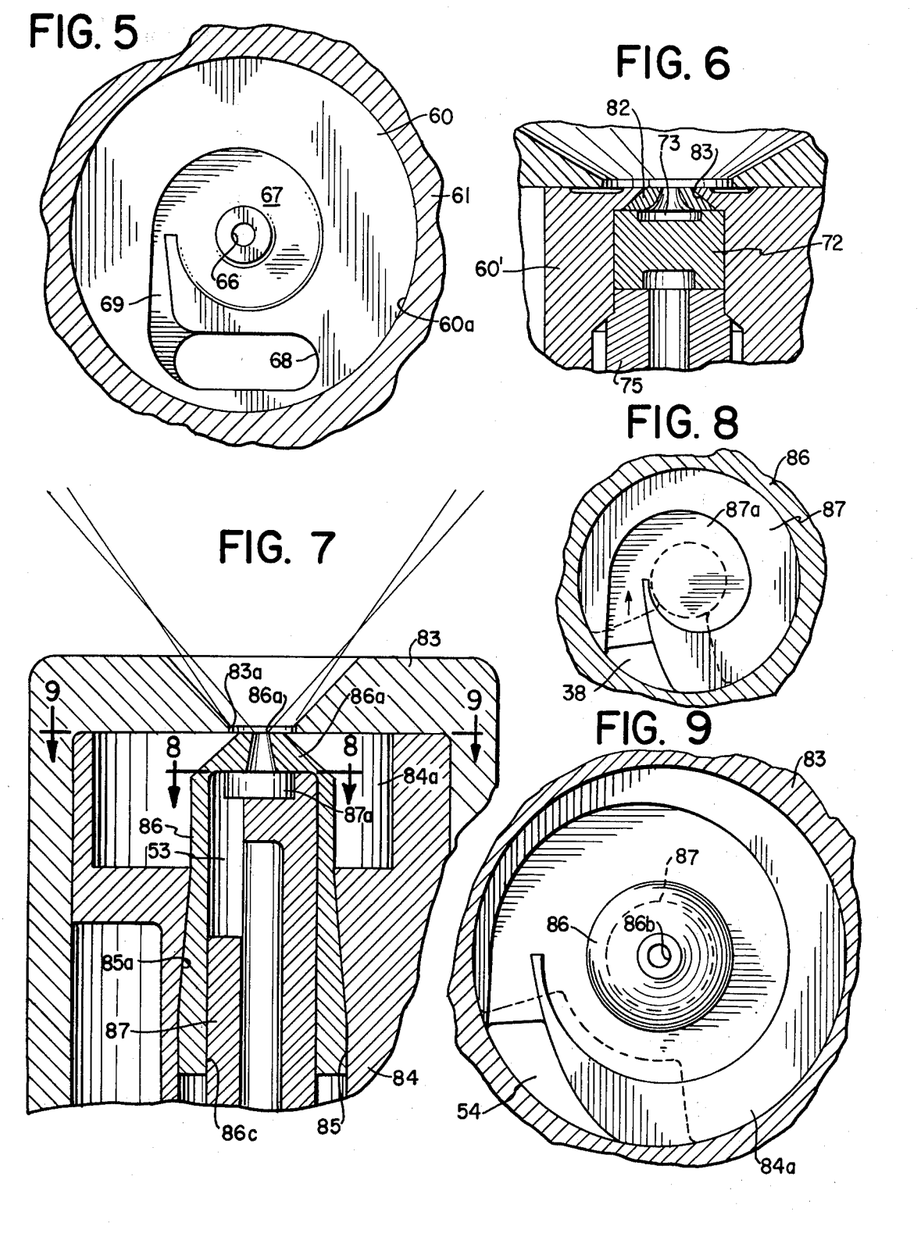
FIG. 5 is a top view of the nozzle along line 5—5 of FIG. 4 showing the secondary swirl chamber body.
FIG. 6 is a fragmentary elevational view, in cross-section of another embodiment of a dual orifice nozzle showing a replaceable outlet orifice plate.
FIG. 7 is a fragmentary elevational view, in section, of another form of nozzle.
FIGS. 8 and 9 are top views of the nozzle taken along lines 8—8 and 9—9 of FIG. 7 respectively.

FIG. 6 shows another embodiment of the invention which differs from the embodiments of FIGS. 1–3 and FIGS. 4–5. Here, the orifice for the primary body 72 is formed as part of a resplaceable outlet orifice plate 82 of conical shape. Plate 82 is of generally conical shape and fits tightly within a matching inner conical surface 83 formed on the upper end of the secondary swirl chamber body 60'. The advantage of this design, as compared to those shown in FIGS. 1–3 and FIGS. 4–5 is that the separate orifice plate 82 is less costly to change, in case a different orifice is required for the primary swirl chamber body than if the entire secondary swirl chamber body carries the primary orifice as an integral part thereof.

FIGS. 7–9 shows another form of a nozzle according to the invention. An outer body 83 serves as a cap for a secondary swirl chamber body 84 having a chamber 84a. The body 84 is formed with a central bore 85 having an inwardly tapered upper end 85a. A retainer shell 86 is located in the bore 85 and has an outer wall shaped to conform to mate with the bore 85, including its upper portion 85a. The shell 86 is formed at its upper end with a conical shaped section 86a which forms at its top a primary orifice 86b. The primary orifice 86b is aligned at the center of a secondary orifice 83a which is formed in the top wall of the cap 83.

The shell 86 has a cylindrical central bore 86c which is shaped to accept and hold a primary swirl chamber body 87 having a swirl chamber 87a. Body 87 is of the same general construction as the primary swirl chamber body 15 of FIG. 1. Therefore, no further description is necessary.

Top views of the primary and secondary swirl chamber bodies are shown in FIGS. 8 and 9, respectively. Primary body 87 is substantially the same as body 15 of FIG. 1. The use of the shell 86 permits precise gaging and alignment of the primary body with respect to the secondary body so that both swirl chambers thereof are accurately aligned with respect to the center of the primary orifice 86b and the secondary orifice 83a.

The nozzle of FIGS. 7–9 operates in the same manner as that of FIG. 1. That is the fluids in the primary and secondary chambers, which can be the same or different, generate two spiral fluid sprays which exit from the orifices 86b and 83a. These two sprays combine to produce a very high energy spray.

Figure 10:
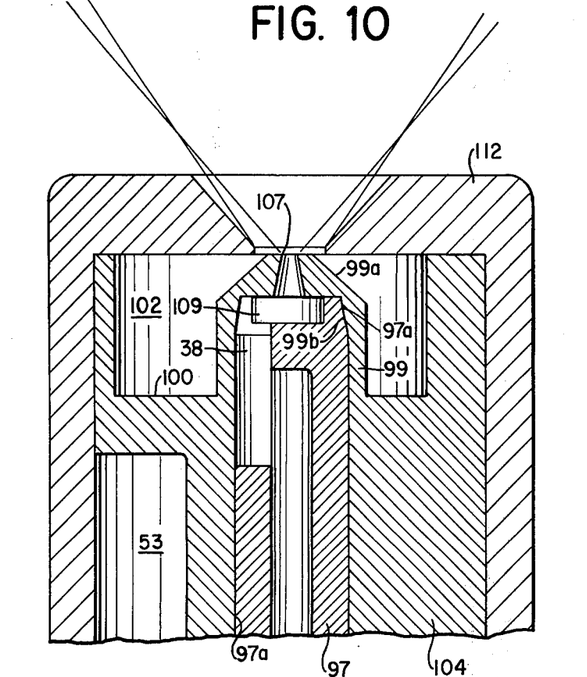
FIG. 10 is a fragmentary elevational view, in section, of another form of nozzle.

FIG. 10 shows another embodiment of the invention similar to that of FIGS. 7–9. Here, the primary swirl chamber body 97 is placed within a bore 97a of a secondary swirl chamber body 104 which has a hollow boss, or collar 99, which protrudes upwardly from the floor, or bottom wall, 100 of the swirl chamber 102 of the secondary swirl chamber body 104. The outside of boss 99 has a conically shaped upper section 99a which has a primary orifice 107 for the exit of the fluid from a primary swirl chamber 109 of the primary body 97. The interior of boss section 99a also is shown as having a tapered shape leading to the orifice 107 at its upper end. The upper end of the interior of shell 99 has a chamfered portion 99b. This mates with and gages a similar chamfered portion 97a at the upper end of the primary swirl chamber body 97. The latter is similar in construction to body 15 of FIG. 1, with the exception of the slight taper of the upper end of passage 38 into the swirl chamber 109. The secondary body 104 differs from the secondary body of FIGS. 1 and 3 in the formation of the boss 99, including the conical portion 99a forming the orifice 107, to house the primary body. A top view of the secondary swirl chamber body for the nozzle of FIG. 10 would correspond to that shown in FIG. 9 with the exception of the shell 99 being formed as part of body 104 rather than being the separate piece 86 as in FIGS. 7–9.

A cap 112 fits over the secondary body 104. The remainder of the construction of the nozzle can be similar to that of FIG. 1, that is, a plug (not shown) is fastened into the cap 112 to hold the secondary body 104 against the inner top surface of cap 112. The filtering arrangement as well as the primary and secondary fluid supplies can be the same.

The nozzles of FIGS. 7–10 differ in construction from that of FIG. 1. In particular, they have a deeper chamber in the secondary swirl chamber body. This permits a higher flow rate. The nozzle of FIGS. 7–9 is somewhat simpler to manufacture than that of FIG. 10 since it does not require the formation of the boss 99. The nozzles of FIGS. 7–10 can operate over a flow range of more than 40:1.

In the nozzles of FIGS. 1–10, the fluid for the primary swirl chamber body is typically the fluid to be used for work purposes, for example, it could be fuel oil, gasoline, water, chemicals, etc. In many cases, the fluid for the secondary swirl chamber body could also be air, steam or gas under pressure. The combination of the two fluids in the nozzle produce highly efficient atomization. Of course, the secondary fluid can be a liquid and identical with the primary fluid.

Figure 11:
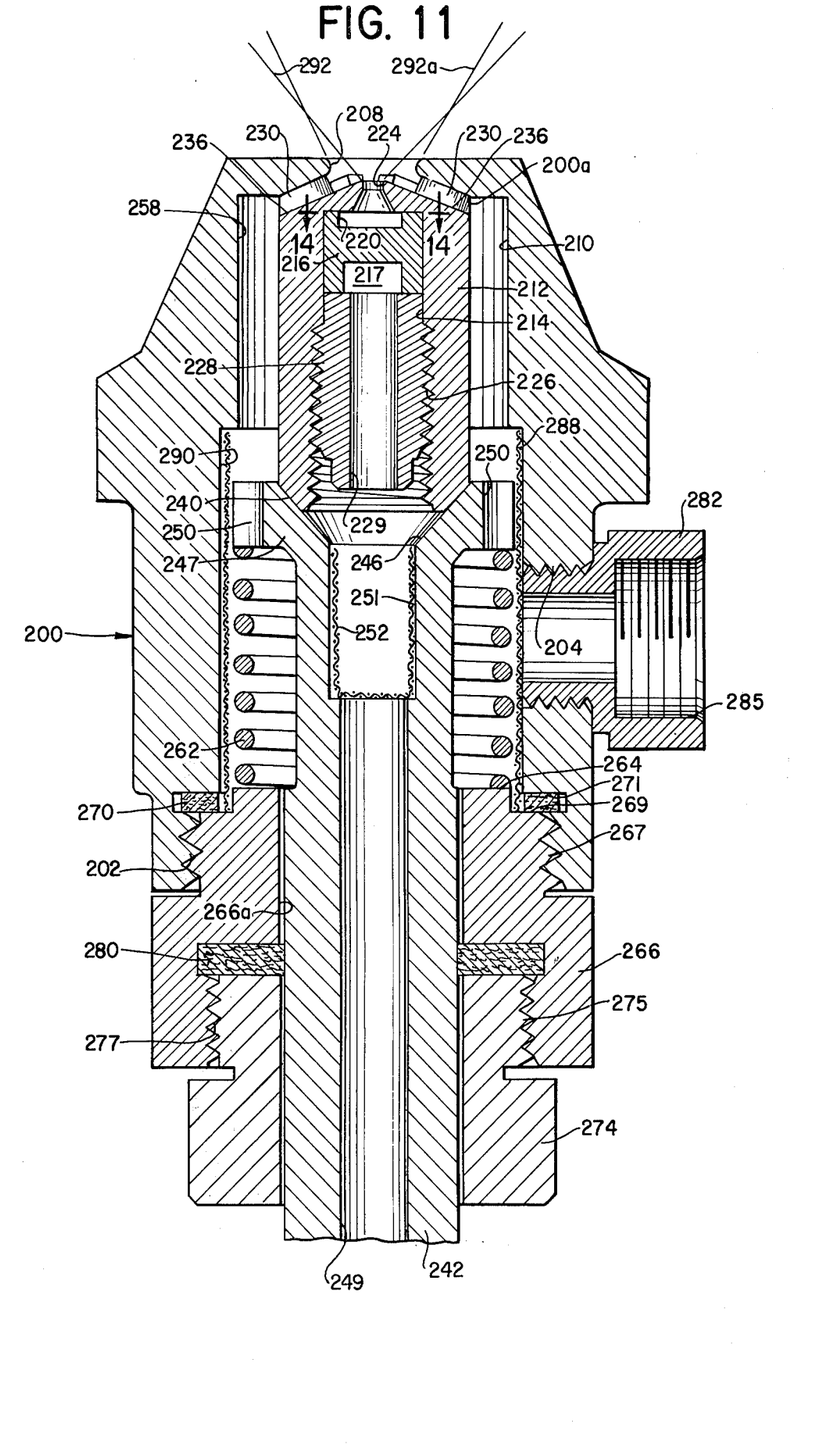
FIG. 11 is an elevational view, in cross-section, of another embodiment of nozzle.

FIG. 11 shows another embodiment of the invention showing a dual orifice nozzle, but using only one swirl chamber body with a single inlet swirl chamber for producing a generally spiral fluid flow. This nozzle can be used with a secondary auxiliary fluid, such as air, to spray fluid into the combustor of an engine with a high degree of atomization efficiency.

Figure 14:
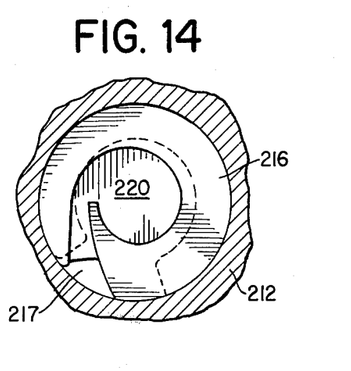
FIG. 14 is a cross-sectional view of the nozzle taken along line 14—14 of FIG. 11.

The nozzle of FIG. 11 includes a housing 200 of stepped cylindrical shape with one set of threads 202 formed on the inside of its lower end, and a second set of threads 204 formed in a bore through the wall of housing 200 perpendicular to its ceneral axis. A secondary orifice 208 is formed at the top of housing 200 at the end of a bore 210 of cylindrical shape, which is formed part way of the length of the housing. A housing 212 having a bore 214 has a swirl chamber body 216 located therein at the top end. Swirl chamber body 216, a top view of which is shown in FIG. 14, is of the same general type as the swirl chamber bodies of FIGS. 4A and 4B, for example, and includes a primary swirl chamber 220 in which the generally spiral fluid flow is generated.

The top of housing 212 is formed as the primary orifice 224 for the primary swirl chamber 220. A thread 226 is formed on the lower portion of the interior of housing 212 which accepts and holds a tubular threaded plug 228 having a passage 229 to keep the swirl chamber body 216 held within bore 214 of housing 212 against the lower face of the primary orifice 224. Thus, the central axis of the body 216 is held concentric with the longitudinal axis of housing 212.

Figure 12A:
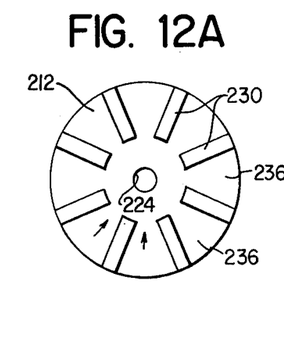
FIGS. 12A, 12B and 12C are top views of different forms of flow passage channels for use with nozzles of FIG. 11.

The upper surface of housing 212 is generally conical and is provided with fluid flow directors or ribs. FIG. 12A shows a preferred embodiment in which the flow directors include a plurality of spaced, radially extending ribs 230. The ribs 230 are of equal height and cooperate with a complementary inner conical shape surface 200a of the top of nozzle housing 200. The spaces between the ribs 230 form radially inwardly and axially extending secondary fuel supply passages 236. These passages exit at the orifice 208 of nozzle housing 200.

Figure 13:
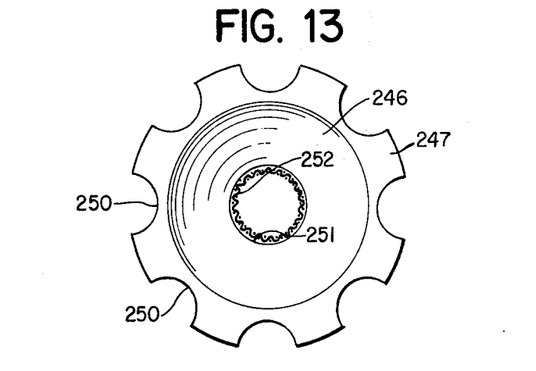
FIG. 13 is a top view of the flange of the retainer plug of FIG. 11.

The housing 212 for primary swirl chamber body 216 is formed at its lower end with a conical surface 240. A retainer plug 242 is located within the central bore of nozzle housing 200 and has a conical upper surface 246 formed at the top of a shoulder, or flange, 247. The conical surface 246 of plug 242 cooperates with the adjacent conical surface 240 of the lower end of housing 212. The flange 247 of plug 242 has a plurality of grooves or cut-outs 250 (see FIG. 13) around its circumference to serve as fluid supply passage. Retainer plug 242 also has a through bore 249 which is aligned with the central longitudinal axis of the swirl chamber body 216. A cylindrical recess 251 into which a filter screen 252 is located at the top end of bore 249 in plug 242. The screen can be brazed to the plug.

An annular passage 258 for the secondary fluid is formed between the outer cylindrical surface of the swirl chamber housing 212 and the inner bore 210 of the nozzle housing 200. A spring 262 is supported on the top surface 264 of a retainer plug 266 which has threads 267 which mate with the threads 202 of nozzle housing 200. The spring presses against the flange 247 of plug 242 to press its conical surface 246 against the lower conical surface 240 of swirl chamber housing 212. The retainer plug 266 has an upper portion with an axial bore 266a, which gages an intermediate portion of plug 242. This arrangement retains swirl chamber housing 212 firmly in place and axially aligned with nozzle housing 200.

A recessed top 269 on retainer plug 266 firmly presses a seal 270 located within an annular recess 271 of nozzle housing 200. A stuffing box 274 has a thread 275 along a portion of its outer diameter which engages a complementary thread 277 on the lower portion of retainer plug 266. A packing 280 located between retainer plug 266 and stuffing box 274 prevents leakage of the fluid.

A threaded nipple 282 is fastened into threads of the transverse bore 204 of nozzle housing 200. Nipple 282 has internal threads 285 adapted to accept a secondary fluid base (not shown). A filter screen 288, which serves as a strainer for the fluid entering through a fluid inlet passage in the nipple 282, is located within an inner bore 290 of nozzle housing 200 and is supported by the shoulder 269 of retainer plug 266.

The fuel, after passing from a supply conduit (not shown) through the primary fuel passage bore 249 of plug 242 and filter screen 252, flows through the inner bore 229 of plug 228, enters through the inlet 217 of swirl chamber body 216 (see FIG. 14) into the swirl chamber 220, circulates along a spiral and is discharged through a primary orifice 224 in the shape of a hollow cone 292.

The secondary fluid enters through the passage in nipple 282, passes through filter screen 288 and grooves 250 in flange 247. The fluid then continues through annular passage 258 and finally is discharged through the supply passages 246 between the ribs 230. It reaches it highest velocity at the exit of passages 236 and circulates within an imaginary circle formed by the inner tips of the ends of the ribs. The secondary flow may be discharged through the secondary orifice 208 in the form of a cone 292a. Should air be used it will impinge upon the primary fluid spray cone thereby exerting a maximum "tearing" effect. This increases the atomization of the liquid.

Figure 12B:
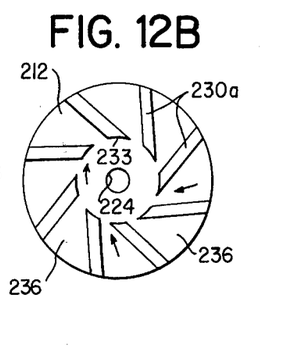

FIG. 12B shows a further form of arrangement for the flow directors 230. Here a plurality of ribs 230a are provided which have spaces 236 therebetween so that fluid flowing through slots 250 and passage 258 can exit through orifice 208. The ribs 230a are offset, or canted, so that their tip ends 233 lie on a circle drawn from the center of housing 212 to inner tips of the ribs. The tip ends 233 can be rounded off or cut slightly as shown, to reduce turbulence. The amount of angle that each rib 230a lies off of a radical drawn from the center of the circle on which the tip ends lie can be selected to produce a good flow pattern. A typical angle is in the range of from about 0° to about 60°. The canted arrangement of ribs 230a gives the secondary fluid an additional swirling motion to enhance its atomizing effect.

Figure 12C:
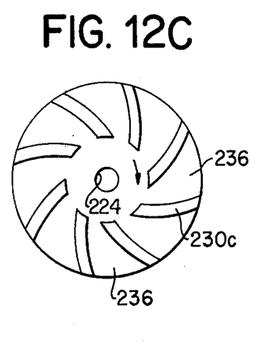

FIG. 12C shows another arrangement for the flow directors in which the ribs 230c are of a somewhat arcuate shape. The ribs and their ends are shaped so that the inner tips of the ends describe a circle when joined by an imaginary line. This configuration also produces a swirling motion for the secondary fluid to enhance its atomizing effect.

While the flow directors 230 are shown formed on the top of housing 212 in each of FIGS. 12A, 12B and 12C, it should be understood that they also can be formed on the lower surface of the portion 200a of housing 200 surrounding the outlet orifice 208.

Figure 15:
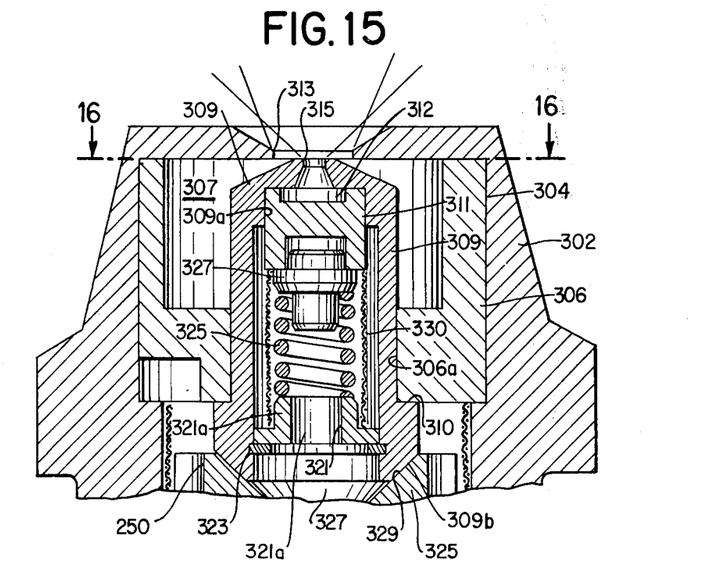
FIG. 15 is an elevational view, in cross-section, of the upper portion of a further embodiment of nozzle.
Figure 16:
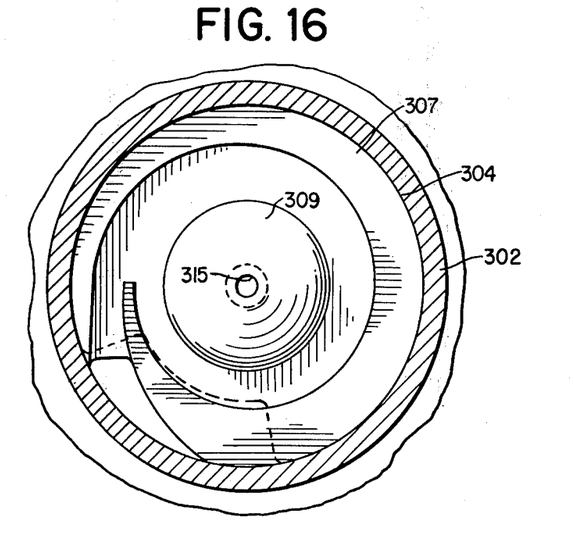
FIG. 16 is a top view of the nozzle taken along line 16—16 of FIG. 15.

FIGS. 15–16 show another embodiment of the invention which differs from the embodiment of FIG. 11 in that the secondary fluid circulates in a separate swirl chamber in a spiral path. It has been found that this provides greater secondary fluid velocities as compared to that produced by the nozzle of FIG. 11. This increases the atomizing power of the fluid, which is of particular advantage for the spraying of highly viscous fluids.

A nozzle housing 302 of stepped cylindrical shape has a bore 304 within which is located the secondary swirl chamber body 306 with its swirl chamber 307. Body 306 is formed with a central opening 306a within which is located a shell 309 having a shoulder 310 which abuts the lower face of body 306. The wall of body 306 surrounding the bore 306a serves as a gage for shell 309. The shell in turn is formed with a reduced diameter of upper section 309a which serves as a gage for a primary swirl chamber body 311 which has a swirl chamber 312. Housing 302 has a secondary orifice 313 in its top wall while shell 309 has a primary orifice 315. The two orifices and swirl chambers are maintained in alignment by the gaging action of the mating surfaces.

The primary swirl chamber body 311 is held within shell 309 by a helical spring 325 and a hollow bushing 321, having a passage 321a. The bushing sits on a retaining snap ring 322 held in a groove 323 in the wall of the shell. Bushing 321 has a reduced diameter upper section on which is placed the lower end of a helical spring 325. The upper end of the spring engages the lower face of a shoulder of a plug 327 and the lower end of the primary body 322 rests on the upper face of the plug's shoulder. The retaining snap ring 322 holds the entire spring and filter assembly firmly in place. This arrangement keeps the primary body 311 properly located in the upper end of shell 309. A filter screen 330 is located between bushing 321 and the lower end of body 311 to filter the fluid moving through bushing passage 321a for primary body 311.

The shell 309 is held in place by an arrangement similar to that used in the nozzle of FIG. 11 to hold housing 212. That is, a plug 326 having a central passage 327, only a portion of which is shown, has a tapered upper surface 329 on which the lower end 309b of the shell rests. The plug 325 has a flange portion with cutouts 250, as in FIG. 13.

In the operation of the nozzle of FIG. 15, the secondary fluid enters the nozzle housing 302 through a suitable port, for example, the threaded nipple 282 of the nozzle of FIG. 11. It moves through the passages 250 of the plug 325 into the secondary swirl chamber 307 of the secondary swirl chamber body 306. The primary fluid enters the primary swirl chamber 312 of the primary body 311 by going through the passage 321a and the filter 330. The spray from the swirl chamber 312 of the primary body 311 leaves through orifice 315 where it mixes with the spray from the secondary swirl chamber 307 which exits through orifice 313.

The nozzles of the present invention also have a substantially uniform weight distribution of the flow in the conical spray, that is, good patternation index over a relatively wide flow range. In addition, the nozzles are simple to construct in a manner such that accurate alignment of parts is ensured.

The nozzles of the present invention have several advantages. First of all, in those embodiments wherein only a single inlet is used in open or both of the swirl chamber bodies, the nozzles are highly resistant to clogging. In addition, the nozzles have a very wide range of flow discharge rates. Whereas prior art nozzles of the simple type, for example, those described in British Pat. No. 760,972 have a range of flow rates from about 1:5 by variation of the fluid pressure, the nozzles of the present invention have considerably higher flow rates, 1:40 or more. In addition, the nozzles of the present invention have the ability to maintain a substantially constant angle of spray over a wide flow range under varying pressures of the fluid. This is important in spray drying applications where it is generally desired that a wide spray angle be maintained. Further, the nozzles have the capability of maintaining a relatively constant coefficient of discharge over a realtively wide range of inlet pressures and a relatively wide range of flow rates. As a still further advantage, the nozzles of the present invention, due to their high atomizing efficiency, produce very fine droplets at relatively low fluid pressures over a wide range of flow rates.

In addition, it is only a minimumm of pressure variation in each swirl chamber between the largest and smallest flow rate which is needed to keep the maximum pressure in each swirl chamber low.

What is claimed is:

1. A nozzle for spraying fluids comprising a nozzle body, said body including first means forming a first swirl chamber having a substantially flat bottom wall and a side wall with a portion thereof in the shape of an arc of a curve, said first means including a single inlet only for receiving a first fluid to be sprayed and conveying it to said first swirl chamber, said first means producing a sprial fluid flow in said first swirl chamber, means forming a first orifice providing the outlet of said first swirl chamber for the first fluid to exit therefrom, said first orifice having a lower surface in communication with said first swirl chamber and an upper surface, and a second means forming a second swirl chamber having a substantially flat bottom wall and a side wall with a portion thereof in the shape of an arc of a curve, said second swirl chamber of said second means is formed surrounding said means forming said first orifice with the depth of the second swirl chamber being greater than the height of said first orifice, said second means including a single inlet only for receiving a second fluid and conveying it to said second swirl chamber, said second means producing a spiral fluid flow in said second swirl chamber, and means forming an outlet for the second fluid adjacent the location where the first fluid exits from adjacent said first orifice commencing at a location which is substantially coplanar with said upper surface of said means forming said first orifice whereby said first and second fluids are mixed.

2. A nozzle as in claim 1, wherein said means forming said first orifice for the outlet of said first swirl chamber includes a portion of said second means forming said second swirl chamber.

3. A nozzle as in claim 1, wherein said second means forming said second swirl chamber has a central bore and said first means forming said first swirl chamber are held in a fixed relationship within said bore to align the respective axes of the two swirl chambers.

4. A nozzle as in claim 2, wherein said second means forming said second swirl chamber has a central bore and said first means forming said swirl chamber are held in a fixed relationship within said bore to align the respective axes of the two swirl chambers.

5. A nozzle as in claim 1, wherein said body means includes a cover having a top portion which engages said second means, said cover top portion having an opening therein through which the fluids leaving said first orifice means and the outlet of said second swirl chamber exit.

6. A nozzle as in claim 3, wherein said means forming said first orifice includes a fitting located within said central bore of said second means, said fitting having an outer wall which defines a portion of the second swirl chamber, said first means forming said first swirl chamber located within said fitting.

7. A nozzle as in claim 3, wherein said means forming said first orifice includes a hollow projection extending upwardly from the floor of the second swirl chamber of said second means, said hollow projection forming a portion of said bore of said second means, said first means having at least a portion thereof located within said projection.

8. A nozzle as in claim 7, wherein said projection is formed as an integral part of said second means.

9. A nozzle as in claim 1, wherein said means forming said second swirl chamber body includes a passage extending for a substantial portion of the height of said second means, one end of said passage communicating with a supply means for said second fluid within said nozzle body, the other end of said passage communicating with the inlet of said second swirl chamber.

10. A nozzle as in claim 9, wherein said means forming said first orifice for the outlet of said first swirl chamber includes a portion of said second means forming said second swirl chamber.

11. A nozzle as in claim 1, wherein said first means is located within said second means, and said means forming said first orifice for the outlet of said first swirl chamber comprises a piece mounted at the outlet end of said first swirl chamber and having a central passage therethrough forming said first orifice, the outer surface of said piece engaging and being gaged by a portion of said second means.

* * * * *